(No Model.) 5 Sheets—Sheet 4.
C. WOWRA.
CAR SEAT.
No. 527,095. Patented Oct. 9, 1894.
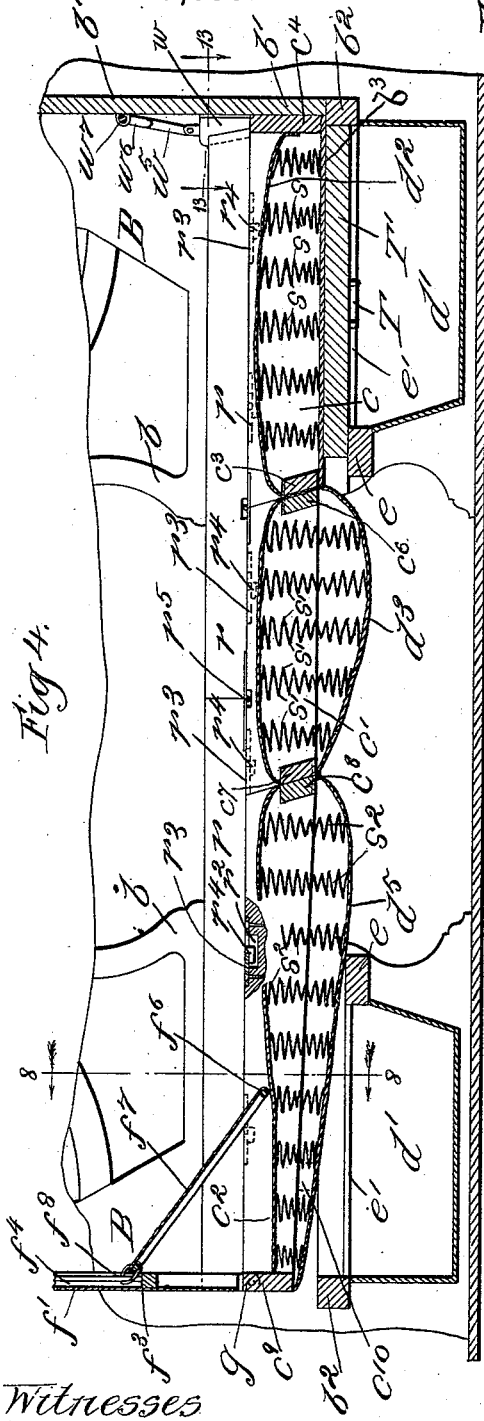
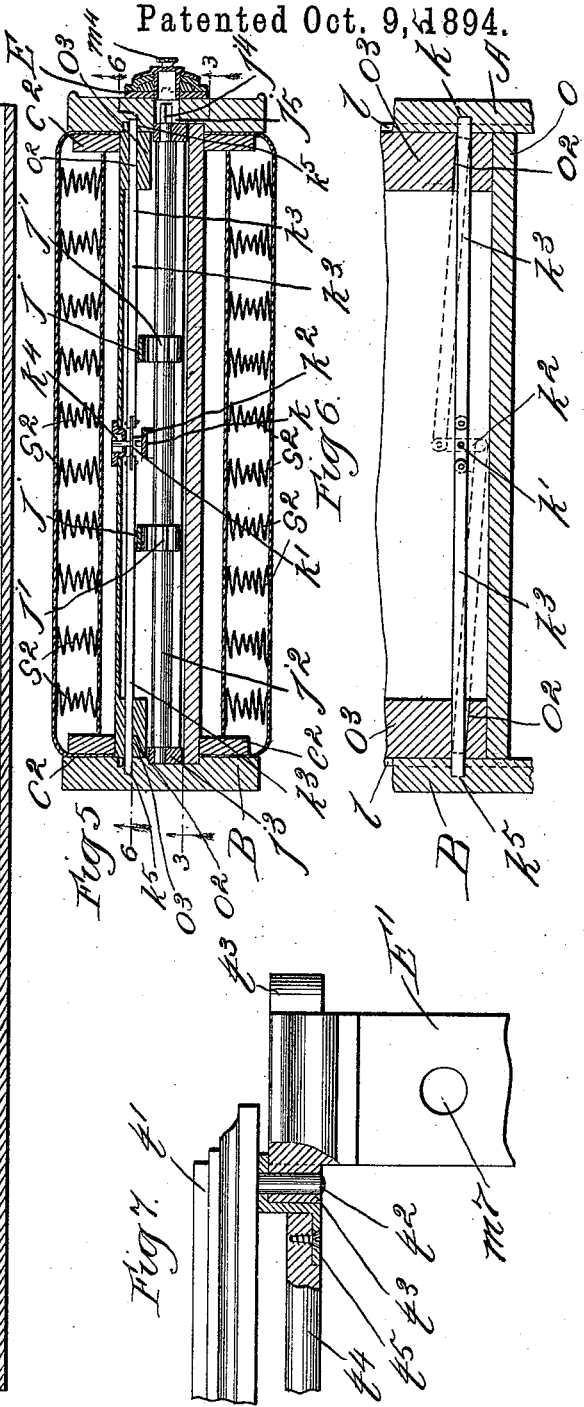
Witnesses
Wm. L. Henning
Wm. N. Rheem
Inventor
Carl Wowra.
by Jesse Cox
Atty.

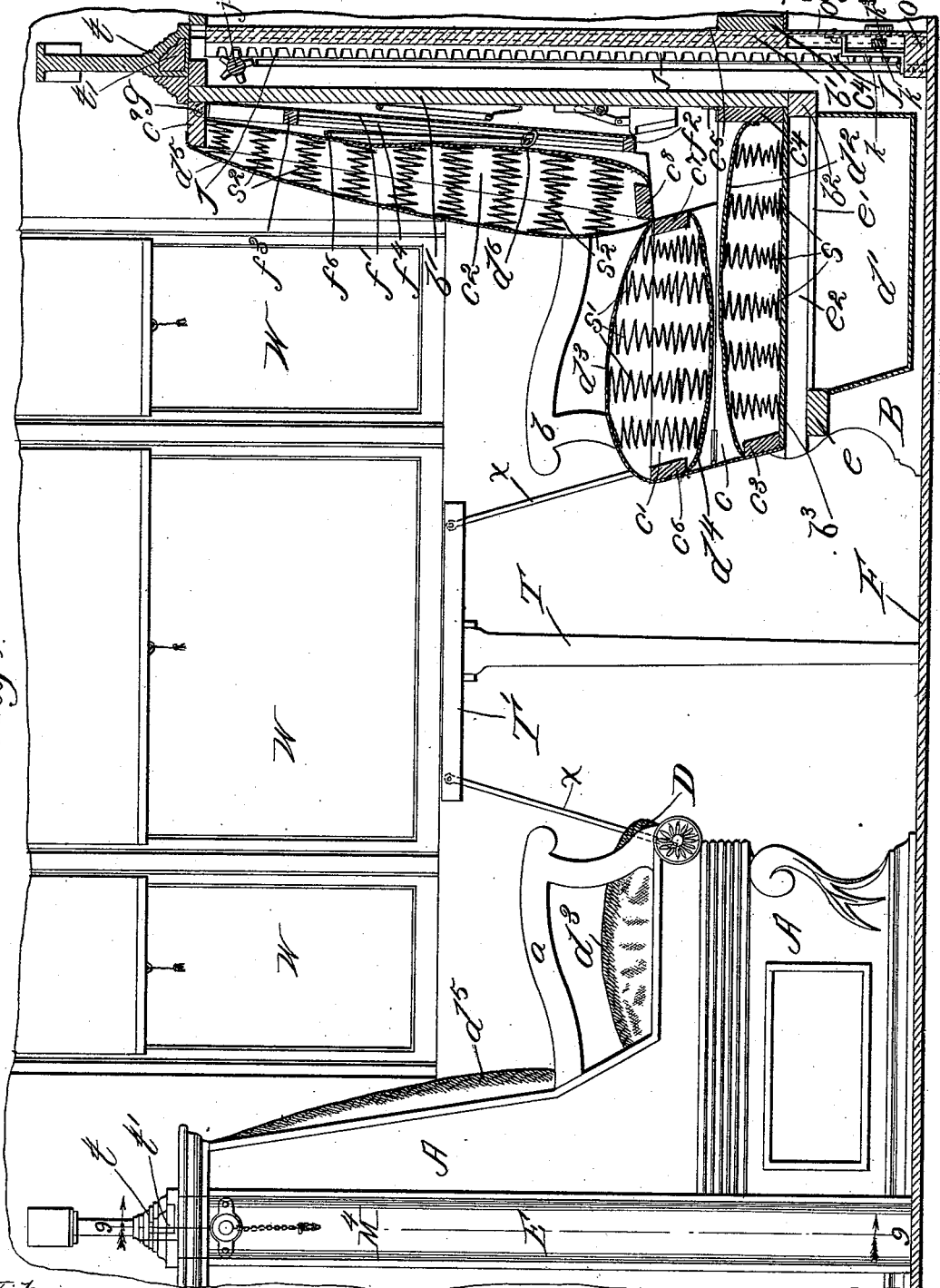

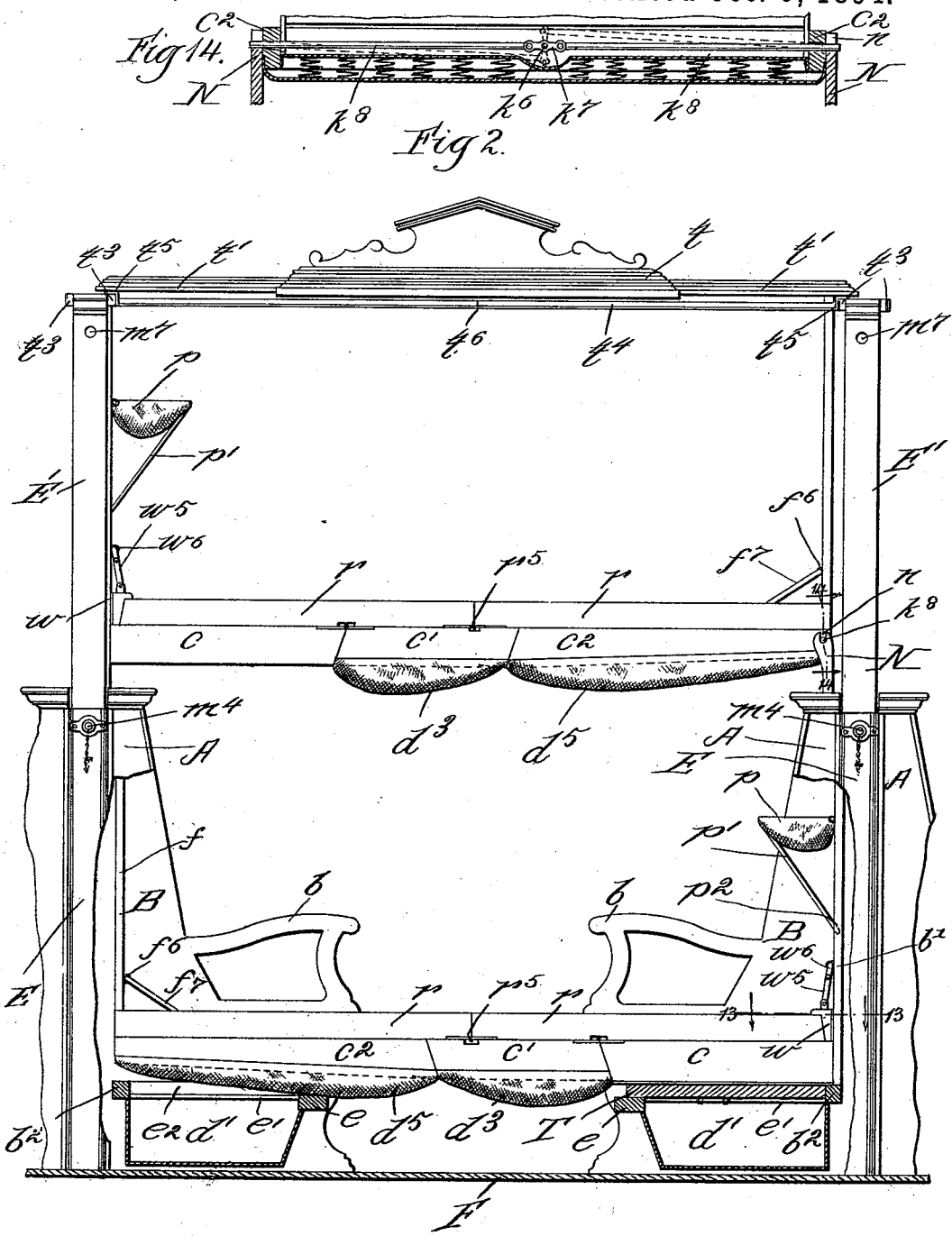

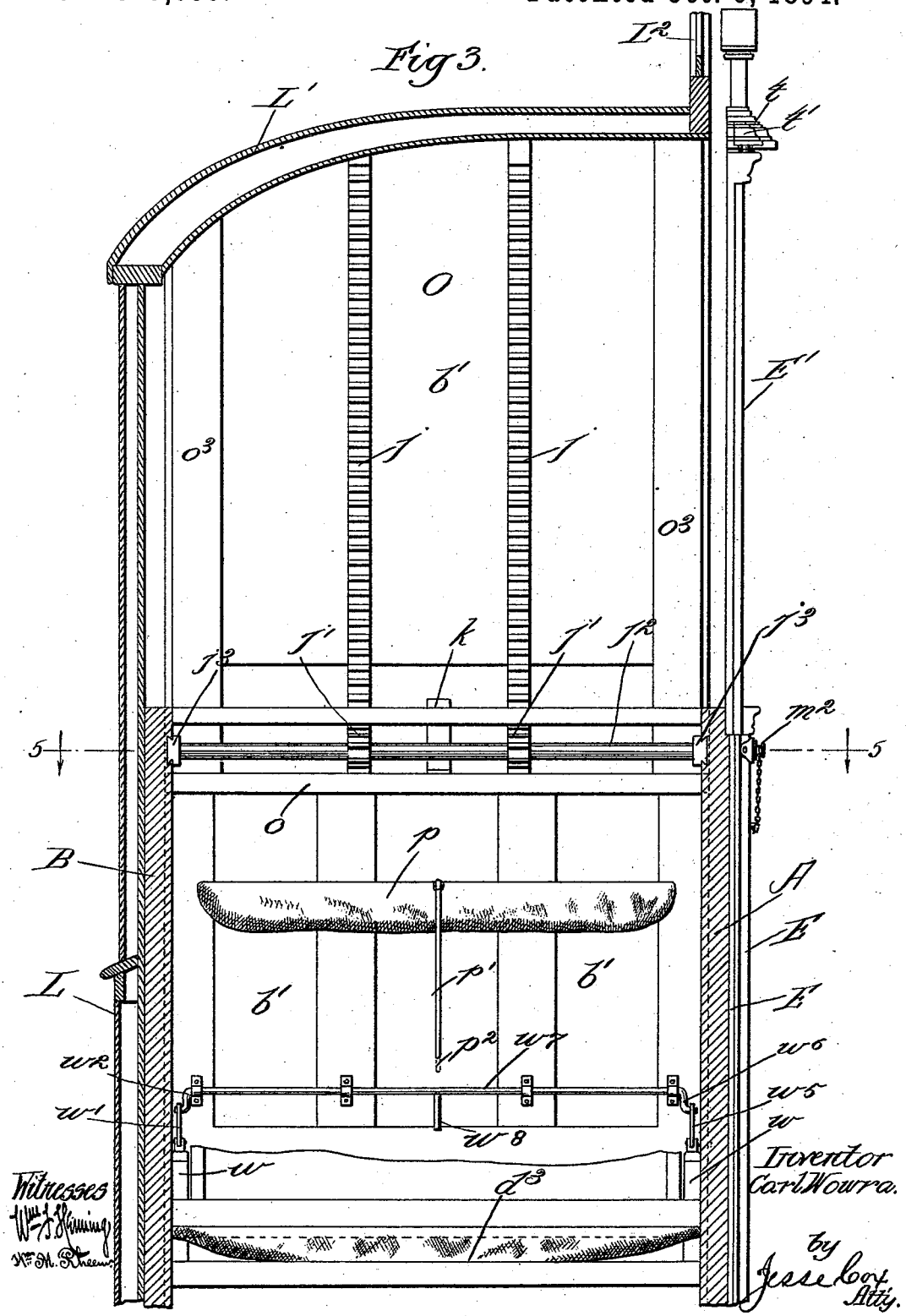

(No Model.) 5 Sheets—Sheet 5.
C. WOWRA.
CAR SEAT.
No. 527,095. Patented Oct. 9, 1894.
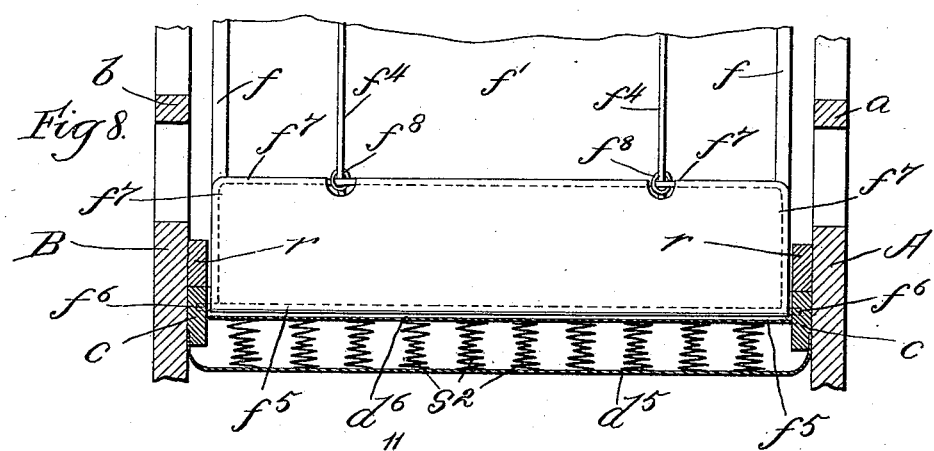
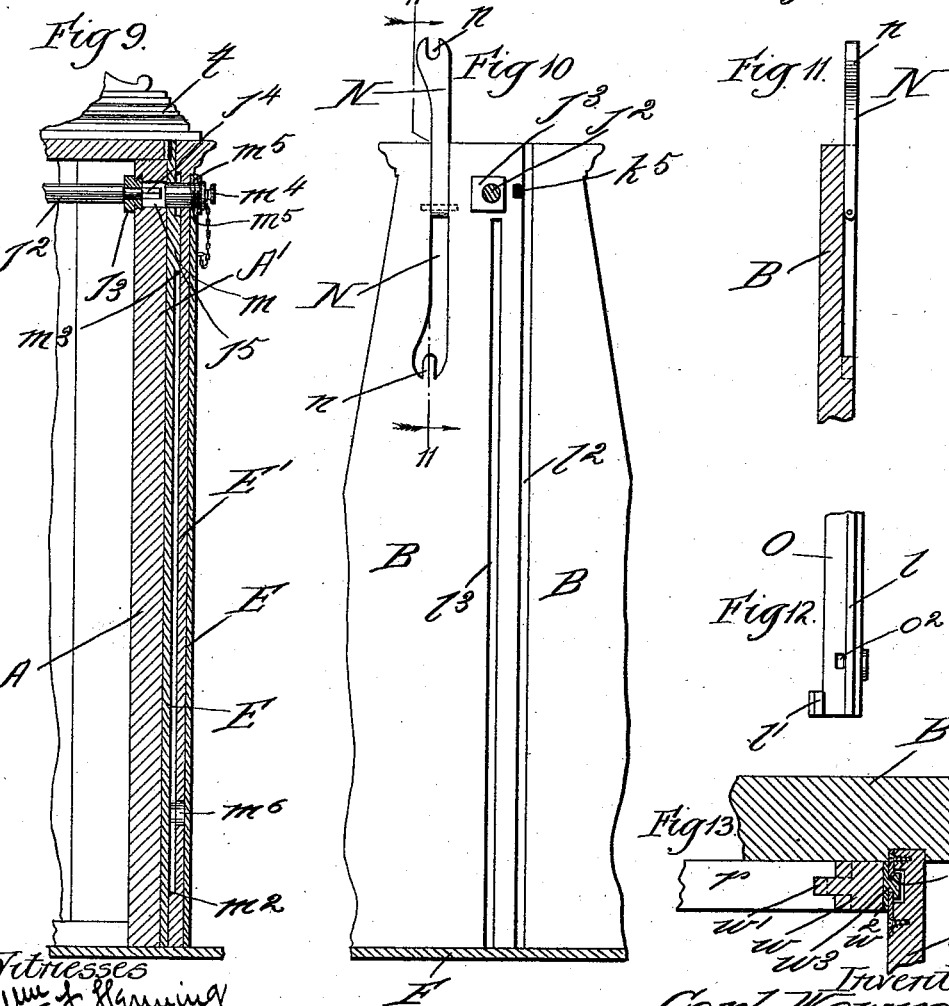

UNITED STATES PATENT OFFICE.

CARL WOWRA, OF CHICAGO, ILLINOIS.

CAR-SEAT.

SPECIFICATION forming part of Letters Patent No. 527,095, dated October 9, 1894.

Application filed December 20, 1893. Serial No. 494,232. (No model.)

*To all whom it may concern:*

Be it known that I, CARL WOWRA, a citizen of the United States, residing in the city of Chicago, in the county of Cook and State of Illinois, have invented a new and useful Improvement in Car-Seats, of which the following is a specification.

My invention relates to improvements in car seats, and consists: first, in such construction and arrangement of a pair of said seats, that a lower and an upper sleeping berth in each section of the car can be formed from the seats themselves by elevating one seat above the other; second, in providing a seat made in sections, which can be extended to form a sleeping berth; third, in the several details of construction hereinafter set forth.

The objects of my invention are: first, to provide a seat made in several parts, which can be extended to form a sleeping berth; second, to dispense with the hinged stationary upper berth now ordinarily in use in sleeping cars, by so constructing and arranging a pair of car seats, that one of said car seats, by being extended, forms the lower berth; and the other, by being elevated and extended, forms the upper berth; third, to provide the several details of construction herein set forth, whereby said car seats are operated and utilized as sleeping berths. I attain these objects by the mechanism illustrated in the accompanying drawings, in which—

Figure 1 represents a side view of two car seats facing each other, with the outside arm and frame of one of said car seats broken away, and also showing the method of elevating one of the car seats to form the upper berth. Fig. 2 represents a side view of a pair of seats with both of said seats extended, and one of said seats elevated to form the upper sleeping berth. Fig. 3 represents a sectional view taken on the line 3—3, Fig. 5, looking in the direction of the arrows, showing the back of the vertically movable seat when elevated, and the means of elevating the same; and also an inside view of the back of the stationary seat, showing the means for adjusting the wedge to hold the removable side bars in position. Fig. 4 shows a side view of the lower seat extended so as to form the lower berth, showing the removable side bars fixed in position to strengthen the berth. Fig. 5 represents a sectional top view of two of the seats placed back to back, taken on the line 5—5, Fig. 3, looking in the direction of the arrows. Fig. 6 is a sectional view on the line 6—6, Fig. 5, looking in the direction of the arrows. Fig. 7 shows the upper portion of one of the extension posts, and the mode of attaching the extension top molding and curtain pole thereto. Fig. 8 is a sectional view of the lower berth when the seat is extended, showing the head board of the lower berth; said section being taken on the line 8—8, Fig. 4, looking in the direction of the arrows. Fig. 9 shows a section of the seat frame next the aisle of the car, and of the extension post and its casing, taken on the line 9—9, Fig. 1, looking in the direction of the arrows. Fig. 10 shows an inside view of the frame of the lower berth, showing the hinged arm for supporting the upper berth. Fig. 11 is a detail sectional view of the hinged arm shown in Fig. 10 taken on the line 11—11, Fig. 10, looking in the direction of the arrows. Fig. 12 is a detail view of the guides on the inside of the back of the vertically movable seat, which guides fit into the grooves on the frame. Fig. 13 is a detail sectional view of the wedge used for holding the removable side bars in position, said section being taken on the line 13—13, Fig. 4. Fig. 14 is a sectional view of the movable bars for supporting the foot of the upper berth, said section being taken on the line 14—14, Fig. 2.

Similar letters refer to similar parts throughout the several views.

The car seats are arranged in pairs in the manner usual in sleeping cars, one seat facing the other. Supported by the floor, F, of the car on each side of the seat, is a frame. One of said frames, A, is next to the aisle of the car and the other, B, is next to the side wall of the car. To these side frames are attached the seat arms, $a$, and $b$, the former being on the frame, A, and the latter on the frame, B. The side frames, A and B, are immovable.

I will first describe the seat which, when extended, forms the lower berth.

The seat is formed of a stationary back, $b'$, which is supported upon a cross-piece, $b^2$. The cross-piece, $b^2$, extends from the side frame, A, to the side frame, B, and rests in mortises in said frame. Said cross-piece, $b^2$, also supports one side of a bottom board, $b^3$, which also extends across the space between the sectional side bars, $c$, and rests at each end in grooves in said sections.

On each end of the seat are side bars formed in three sections, lettered respectively, $c$, $c'$ and $c^2$; which said sections are hinged together at their contiguous extremities, and inclose the spring cushions at the bottom and back of the seat; the section, $c^2$, extending to the top of the back of the seat when it is closed. The sections, $c'$ and $c^2$, are movable, and can be thrown down and extended so as to be in a straight line with the section, $c$. Said section $c$, rests on ledges, (not shown,) in the side frames A and B. Extending from one of the sections, $c$, on one side of the seat, across to the other, and supported in mortises in said sections, are the cross-pieces, $c^3$ and $c^4$; the cross-piece, $c^3$, being at the front, and the cross-piece, $c^4$, being at the rear part of the seat. A flexible covering, $d^2$, extends from the top of the cross-piece, $c^3$, to the cross-piece, $c^4$, and beneath this covering are a number of helical springs, $s$, $s$, $s$, resting on the bottom board, $b^3$, forming with said cross-pieces, side bars and flexible covering, a spring bed-bottom. The cross-piece, $c^4$, and sectional side bars, $c$, are hinged to the back, $b'$, at $c^5$, so that the seat can be lifted to enable the operator to get access to the receptacle or space, $d'$, below the bottom board, $b^3$. Mortised into the sectional side bars, $c'$, at each extremity thereof, are cross-pieces, $c^6$ and $c^7$, extending across the seat. These cross-pieces, $c^6$ and $c^7$, extend from the top of the sectional side bar, $c'$, when closed, only part way of the width of the sections, $c'$, so that when the section, $c'$, is thrown down so as to be in line with the section, $c$, the top of the cross-piece, $c^6$, will be no higher than the top of the cross-piece, $c^3$. A flexible covering, $d^3$, extends from the top of the cross-piece, $c^6$, to the top of the cross-piece, $c^7$; and another flexible covering, $d^4$, extends from the under side of one of these cross-pieces to the other. Between these two flexible coverings, $d^3$ and $d^4$, are placed helical springs, $s'$, $s'$, forming with said cross-pieces and coverings a spring mattress, which forms a cushion for the seat when the sectional side bars are closed, and a part of a mattress when the side bars are extended. Similarly between the sectional side bars, $c^2$, on each end of the seat, are cross-pieces, $c^8$ and $c^9$; one, $c^9$, at the free extremity of said sectional side bars, and forming the top of the seat back, and the other, $c^8$, at the part of said sectional side bars, $c^2$, where they are hinged to the section of the side bar, $c^2$. Said cross-pieces are not the full width of said side bars, $c^2$, but are only wide enough so that when the section of the side bars, $c^2$, are extended to be in line with the sections $c'$, and $c$, the cross-piece, $c^8$, will be no higher than the cross-piece, $c^7$. A flexible covering, $d^5$, extends from the outer portion of the cross-piece, $c^9$, to the part of the cross-piece, $c^8$, where it is hinged to the cross-piece, $c^7$; and another flexible covering, $d^6$, extends from the cross-piece, $c^8$, to the cross-piece, $c^9$, opposite to the covering, $d^5$. Between these coverings are helical springs, $s^2$ $s^2$, forming a spring cushion for the back of the seat, when the side bars are closed, and a mattress when the side bars are extended.

A cross-bar, $e$, rests in a mortise on each side frame, A and B; and a strip, $e'$, extends from the cross-bar, $e$, to the cross-piece, $b^2$, forming with the bar, $e$, a guide for the removable side bars or table when the same are slipped under the seat in the space, $e^2$.

To the cross-piece, $c^9$, at the top of the back of the seat is pivoted at $g$, a rectangular frame composed of the pieces, $f, f$, with a partition of thin boards, $f'$, between them. Two cross-pieces, one, $f^2$, at the free end of the frame, and one, $f^3$, a short distance from the pivot, $g$, extend across the frame. Between these cross-pieces, and extending from one to the other, are two rods, $f^4$, $f^4$. Extending from one sectional side bar, $c^2$, to the other on the opposite end of the seat, is a rod, $f^5$, which is pivotally attached to the said sectional side bars at $f^6$. A bent rod, $f^7$, is attached to said cross rod, $f^5$, by eyes, and extends from one end of the seat to the other, forming a frame which is covered by some slightly flexible material. Rings, $f^8$, $f^8$, slidingly connect the upright rods, $f^4$, $f^4$, with the bent rod, $f^7$.

When the sectional side bar, $c'$, is folded over upon the section, $c$, and the section, $c^2$, stands in a perpendicular position, the mechanism described forms a car seat; but when it is desired to form said seat into a berth, the hinged sections, $c'$ and $c^2$, of the side bars, are extended so as to be in line with each other, and with the section, $c$; the under part of the section, $c^2$, resting upon a ledge, $c^{10}$ in the side frames, A and B.

In order to stiffen the sectional side bars, $c$, $c'$ and $c^2$, removable bars, $r$, $r$, made in two sections hinged together on their under side at $r^4$, are used on each side of the berth. Recesses, $r^2$, $r^2$ are cut in the upper sides of the sections, $c$, $c'$ and $c^2$, and metallic plates, $r^3$, $r^3$, inserted therein to receive the hooks, $r^4$, $r^4$, placed on the under side of the said removable bars, $r$, $r$. The removable side bars $r$, $r$, are shorter than the space between the frames at the head and foot of the berth, so that these hooks, $r^4$, $r^4$, may be put into the recesses, $r^2$, $r^2$, and engage with the plates, $r^3$, $r^3$. At the extremity of the removable bars, $r$, $r$, nearest the back, $b'$, said bars are beveled so as to receive the wedges, $w$, $w$, on each side of the seat. These wedges have each a tongue, $w'$, which fits into a beveled mortise on the end of the removable side bars, $r$, $r$. Upon the side of each of the wedges, $w$, nearest the back, $b'$, is a plate, $w^2$, having thereon a T shaped head, $w^3$, which slides in a guideway, $w^4$, formed in the back, $b'$, by means of metal plates fastened to the back, $b'$. This wedge, $w$, is attached to a link, $w^5$, which link is attached to a crank, $w^6$, on a pivoted rod, $w^7$, said rod being attached by straps to the back, $b'$. Said rod, $w^7$, is operated by a handle, $w^8$. By turning down this handle, the wedges, $w$, are forced into the spaces between the back, $b'$, and the ends of the bars, $r, r$, and the bars $r, r$, are thus firmly held in position so that the hooks $r^4, r^4$, cannot become disengaged from the plates, $r^3, r^3$.

It will be seen that the side bars $r\ r$ serve a double purpose, in that they not only stiffen the sections $c\ c$, but being placed on top of said sections they form a guard rail for the outside of the berth so as to prevent the mattress and clothing which are used in the berth from slipping out of the same.

When the several parts are extended, the pivoted frame formed by the parts, $f$, and $f'$, will stand upright at the head of the berth, and the frame formed by the rod, $f^7$, and pivoted rod, $f^6$, with their covering, will be drawn into a position to form a pillow rest at the head of the berth. The berth being thus extended and strengthened by the removable side bars $r\ r$, an ordinary mattress of hair or other suitable material may be placed upon the spring mattresses formed by the helical springs, cross-pieces and coverings above described, so as to render the bed more comfortable.

It is obvious that the springs, $s$, $s'$ and $s^2$, should be so arranged as to bulge upward as much as possible near to the cross-pieces which inclose the springs when the seat is extended, so that the occupant will not feel the said cross-pieces. When the several parts are thus extended to form the lower berth, the pocket, $p$, which is hinged to the back, $b'$, and which is pushed up against the back when the seat is closed, may be permitted to swing down and open, and is then supported in a convenient position as a receptacle, by the rod, $p'$, which is attached to the mouth of the pocket at one end, and at the other rests in an aperture, $p^2$, in the back, $b'$.

The hair mattress used when the seat is extended to form a sleeping berth, may, when the seat is closed, be placed in the space beneath the covering, $d^4$, and in the vacant space behind the cross-piece, $c^7$, and may extend upward behind the covering, $d^6$.

When it is desired to close the seat after it has been extended to form a berth, the wedges $w$, are lifted from behind the removable bars, $r, r$, by turning the rod, $w^7$, by the handle $w^8$. The removable side bars are then removed, and the several parts closed upon each other. The removable side bars, $r, r$, may then be folded together, and placed beneath the seat in the space, $e^2$.

The vertically movable seat which is used to form the upper berth is composed of exactly similar parts and formed in the same manner as is the seat which forms the lower berth, with such additional mechanism as is hereinafter described.

To the outside of the back, $b'$, of the movable berth, near the center thereof and a short distance apart, are firmly attached two racks, $j, j$, said racks extending from the top to the bottom of said back, and resting upon the foundation cross-piece, $o$. Two pinions, $j', j'$, are fixed on the shaft, $j^2$, and mesh with the teeth upon said racks. Said shaft, $j^2$, has its bearings on each side of the berth in the brackets, $j^3, j^3$, which are dove-tailed into the side frames, A and B, respectively. On the extremity of this shaft, $j^2$, within the side frame, A, is an angular piece, $j^4$, upon which a key or wrench may be fitted to rotate said shaft. A suitable aperture, $j^5$, is made in said side frame, A, into which said angular part, $j^4$, projects. To guide said movable seat when the same is being elevated, there are fitted at each end of the movable back, $b'$, two strips, $l$, and $l'$, which fit into the grooves, $l^2, l^3$, respectively, on the inside of the frames, A and B, forming guides for said back. To a strong timber cross-piece, $o$, which also forms a support for the lower ends of the racks, $j, j$, is attached the bracket, $k$, which is also attached at its upper end to the extension, $o'$, of the back, $b'$. Said extension, $o'$, is connected to the lower cross-piece, $o$. A strong pivot-pin, $k'$, extends from this bracket, $k$, to the extension, $o'$, of the back, and is supported by said bracket and extension. Upon this pivot-pin is rigidly attached a link, $k^2$, to which are pivoted two sliding bars, $k^3, k^3$. The end of the pivot pin, $k'$, is formed into an angular piece, $k^4$, to which may be fitted a key or crank to turn said pivot-pin. When said lower berth is elevated, the link, $k^2$, and the bars, $k^3, k^3$, may be turned by the crank or pin in the angular part, $k^4$, of the pivot-pin, $k'$, so that said bars and link will be in line with each other. The bars will then be forced through suitable apertures, $o^2$, in the side timbers, $o^3$, by which the back and extension of the back, $o'$ are strengthened, into suitable mortises, $k^5, k^5$ in the side frames, A and B, near the upper extremity thereof, thus supporting the foot of the upper berth in its position when fully elevated. In the cross-piece $c^9$, which forms the top of the seat when closed is another pivot-pin, $k^6$, to which is firmly attached a link, $k^7$, and pivoted to said link are two sliding bars, $k^8, k^8$. These sliding bars are forced through suitable apertures in the sectional side bars, $c^2$, to the open slots, $n$, in the arms, N. Said arms, N, are hinged to the inside of the upper part of the side frames, A and B, respectively, and fit into grooves cut on the inside of said frame, so that said hinged arms can be placed in an upright position when the upper berth is extended to receive the extremities of the rods, $k^8, k^8$, to support the head of the upper berth. When the upper berth is closed, these arms, N, can be turned down so as to be out of the way, as shown in Fig. 10.

To the outside of the frame, A, is fitted a casing, E, within which casing is a movable extension arm, E'. This extension arm, E', can be raised up to a suitable height to furnish a support for the curtain pole, $t^4$, and the extension molding, $t'$. The height to which said extension arm, E', can be raised, is limited by the shoulder, $m^2$, on the lower part of the extension arm coming in contact with a like shoulder, $m^3$, on the inside part of the casing E. Said extension arm, when elevated, is sustained in its position by a plug, $m^4$, extending through a suitable aperture, $m^5$, of the casing, and a corresponding aperture, $m^6$, of the extension arm, E'.

When the seats are closed, there rests upon the top thereof, removably attached thereto in any suitable way, a molding, $t$, which is hollowed out in the center to receive two extension arms or moldings, $t'$, $t'$. When the vertically movable seat is elevated, this molding is removed, and the extension moldings, $t'$, $t'$, extended. Upon the outer end of each of the extension moldings, $t'$, $t'$, is a small pin, $t^2$, which fits into a lug, $t^3$, on the upper part of the extension arm, E'. Said lug has an aperture therein to receive the pin, $t^2$. A curtain pole, $t^4$, which is divided and hinged in the center on the under side thereof, has thereto attached at each end, a bracket, $t^5$, said bracket being attached to the under side of the curtain pole, and adapted to extend up and over the lug, $t^3$, on the extension arm, E'. Said bracket, $t^5$, has a hole through the top so that the pin, $t^2$, can extend through the hole in the lug, $t^3$, on the extension arm, E'. The extension arm, E', being elevated, the molding, $t$, and extension moldings, $t'$, are stretched form the top of the extension arm, E', at one end of the upper berth to the extension arm, E', at the other end of the berth, and the curtain pole and extension moldings are held firmly in position by the pin, $t^2$, passing through the aperture in the bracket, $t^5$, and in the lug, $t^3$, at the top of each extension arm. The hinge, $t^6$, in the curtain pole, $t^4$, is on the under side thereof, so that the curtain pole will remain in a rigid position across the top of the berth when said curtain pole is extended. A table, having a hinged leg, T, and top, T', may be placed between the seats when closed; said table being further braced when in use by hinged rods, $x$, $x$, extending from each end of the table top to the sectional side bars. When this table is not in use, it may be placed in the space, $e^2$, beneath one of the seats, the leg, T, being folded against the top, T', and the bars, $x$, $x$, being also folded so as to occupy said space. When the extension arm, E', is let down within the casing, the plug, $m^4$, may be placed in the aperture, $m^5$, in the casing through another aperture, $m^7$, in the upper portion of said extension arm, E'.

L represents the side of the car; L', the top of the car and $L^2$ an upward extension of the roof of the car, having therein ventilating windows, and W represents the car windows.

By the use of this construction herein described, the hinged stationary upper berth is dispensed with, thus allowing more space in the upper part of the car, and permitting the car windows being made larger than they can be made in the ordinary sleeping car with a hinged upper berth. The windows can also be made large enough to admit light and air into the upper berth; and the construction described is much cheaper than the ordinary sleeping car with a hinged upper berth.

What I claim as new, and desire to secure by Letters Patent, is—

1. The combination, in a car seat, of a series of hinged sections which form the seat and back of the car seat, said sections being adapted to be extended to form a berth, and side bars detachably secured to said extended sections to stiffen the same, said side bars being arranged on the upper side of said sections to form guard rails for the berth, substantially as described.

2. In a car seat, the combination with a series of hinged sections forming the seat and back thereof and adapted to be extended in horizontal alignment with one another to form a berth, of means for raising said sections to an elevated position, and side bars detachably secured to said extended sections, to stiffen and support the same, substantially as described.

3. In a car seat, the combination with a series of hinged sections which form the seat and back thereof and which can be extended to form a berth, of stiffening side bars detachably secured to the upper side of the berth so that they form guard rails for the same, removable locking devices to secure said side bars in their operative position, racks secured to the removable back of the car seat, and a shaft carrying pinions which engage said racks and elevate the same together with the said hinged sections, substantially as described.

4. In a car seat, the combination with a series of hinged sections adapted to be extended to form a berth, of removable side bars detachably secured to said hinged sections, and vertically sliding wedges arranged to drop behind said side bars and lock the same in position, substantially as described.

5. The combination with a car seat composed of sections hinged together in such a manner that the said sections can be extended to form a berth, of means, substantially as described, for elevating said sections, and sliding bars carried by said sections and attached at their inner ends to a crank, and means for turning said crank and for throwing the ends of the bars into the suitable seats in the side frames to support the berth, substantially as described.

6. In a car seat, the combination with the side frames, of hinged sections which form the seats and berths, means for elevating and supporting said hinged sections, vertically sliding extension arms mounted in said side frames, a curtain support carried by said arms and means for holding said arms in their extended positions, substantially as described.

CARL WOWRA.

Witnesses:
ARTHUR M. COX,
JENS. L. CHRISTENSEN.